May 21, 1968 W. E. CORNELL III 3,384,339
TAMPERPROOF VALVE HANDLE
Filed Sept. 10, 1965
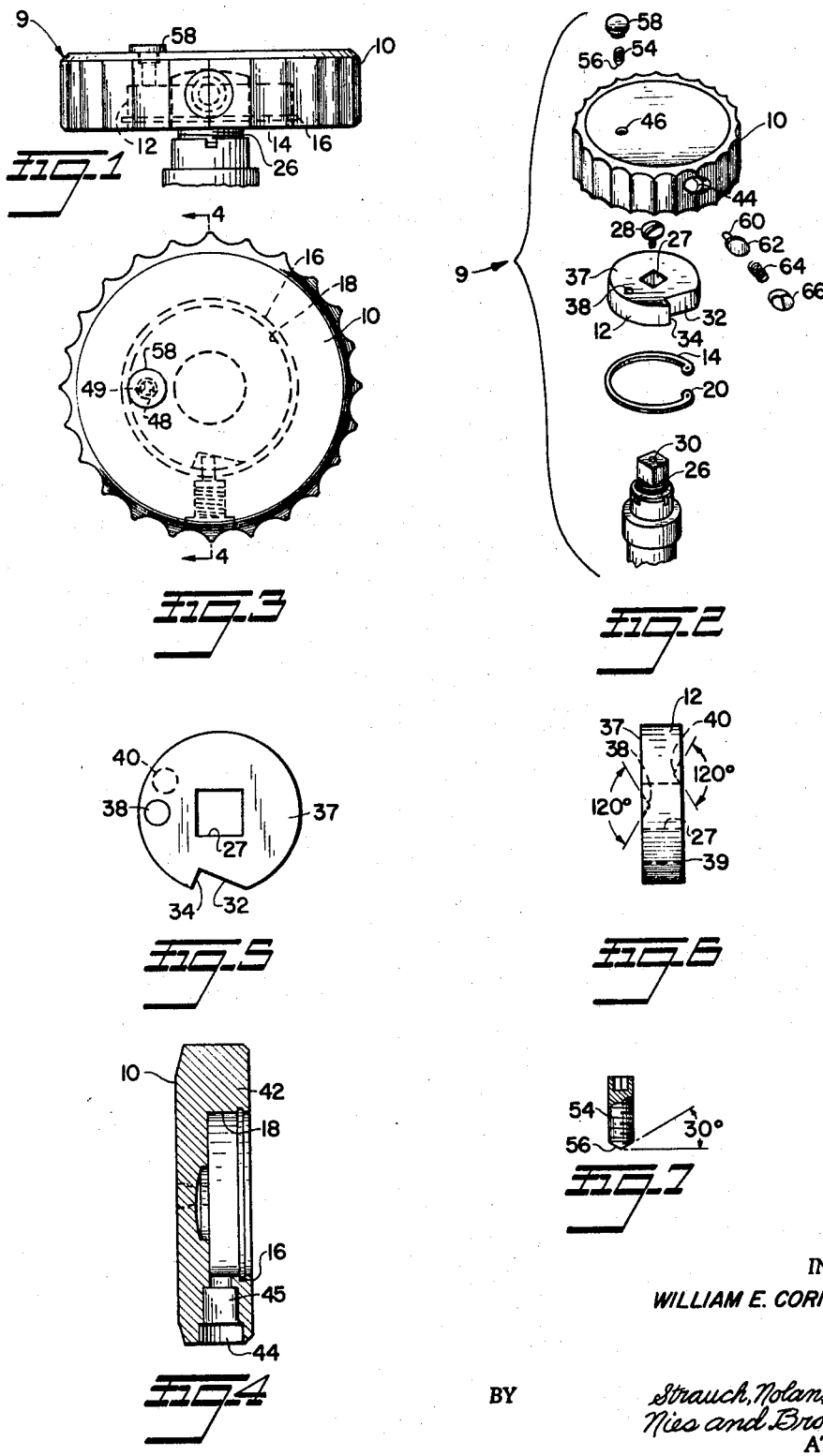
INVENTOR
WILLIAM E. CORNELL, III
BY Strauch, Nolan, Neale,
Nies and Bronaugh
ATTORNEYS United States Patent Office 3,384,339
Patented May 21, 1968

3,384,339
TAMPERPROOF VALVE HANDLE
William E. Cornell III, 533 Coral Way,
Coral Gables, Fla. 33134
Filed Sept. 10, 1965, Ser. No. 486,293
4 Claims. (Cl. 251—291)

ABSTRACT OF THE DISCLOSURE

A valve operating handle provided with a one-way drive clutch having a removable disabling drive connection to prevent unauthorized operation of the valve from either a preset open or closed position and pilfering of fluid commodity dispensed on a credit or prepaid basis.

Background of invention

This invention relates generally to valve handles and more specifically to a tamperproof valve handle which can be made selectively inoperative to prevent unauthorized opening or closing of a valve once it has been fixed in a predetermined extreme position.

Fuel gas, for example low pressure tank gas (L.P.G. gas), is marketed for domestic home consumption on credit or a prepaid metered basis. When timely credit payments are not made or the prepaid quantity of gas has been consumed, it is customary for the supplier to shut off the home owner's inlet gas line until timely credit payments are resumed or until prepayment for a further metered quantity of gas is made. In such gases, the supplier's representative closes the outlet valve from the tank and padlocks the valve or in some other manner attempts to secure the valve to prevent the consumer from opening the valve and stealing gas. In other service, for example, steam water or other fluid line service in industrial plants constant supplies of fluid necessitate securing a supply valve against inadvertent closure by unauthorized personnel. To meet such conditions of service, it has been customary to provide padlocks or other lock mechanisms to assure that the desired inoperative or operative position of the valve is maintained until authorized personnel with an appropriate key or other means condition the valve for actuation to a different position. Examples of some of the prior art proposals are shown by United States Letters Patent 440,714 to Lamb et al. dated Nov. 18, 1890, 462,639 to Haines dated Nov. 3, 1891, and 1,855,414 to Otton dated April 26, 1932.

It has been found in practice that the key lock mechanisms and one-way clutch mechanisms heretofore proposed are inordinately expensive for multi-tank installation by suppliers of L.P.G. gas, require elaborate lock mechanisms to prevent lock picking or circumvention by use of skeleton or like keys, and are readily disabled by unscrupulous gas consumers.

Summary of the invention

Accordingly it is a primary object of this invention to provide a low cost tamperproof valve handle which is of extremely simple construction with few parts and that is inexpensive to manufacture.

Another object of this invention is to provide a valve handle which has few operating parts and which consists of simple hand wheel enclosed one-way clutch means permitting turning of the valve stem in one predetermined direction such that the valve can be rotatably advanced only to one operative extreme by rotation of the hand wheel and a simple removable connector means adapted for installation by authorized service personnel to render the one-way clutch means ineffective for rotating the valve to its other position.

Still another object of this invention is to provide the valve hand wheel with specially designed screw connector means installable by authorized personnel for overriding the one-way clutch means for non-rotatably connecting the valve hand wheel to the valve stem.

Yet another object of this invention is to provide a simple special threaded and formed set screw means which fixedly connects the valve hand wheel with an intermediate disc clutch member fixed to the valve stem so that rotation of the hand wheel in either direction concomitantly rotates the valve stem.

Still another object of this invention is to provide a handle assembly for a rotatable member permitting rotation of the rotatable member in one direction only to a predetermined operative extreme while preventing rotation of the rotatable member in the opposite direction wherein a simple mechanical inversion of one member of the assembly reverses the permitted direction of rotation.

Brief description of the drawings

These and other objects of the present invention will become apparent from the following description and appended claims when read in conjunction with the accompanying drawings wherein:

FIGURE 1 is a side elevational view of the valve handle of this invention installed upon a conventional valve stem end;

FIGURE 2 is an exploded view of the installed valve handle of FIGURE 1;

FIGURE 3 is a top plan view of the valve handle of FIGURE 1;

FIGURE 4 is a sectional view of the valve hand wheel of FIGURE 1 taken substantially on line 4—4 of FIGURE 3;

FIGURE 5 is a top view of the inner clutch disc of the valve handle;

FIGURE 6 is a side elevational view of the clutch disc of FIGURE 5 as viewed from the left of FIGURE 5; and FIGURE 7 is an enlarged elevational view partially in section of the connector screw employed in this invention.

Description of the preferred embodiment

Referring to the drawings wherein like reference numerals are used throughout to indicate the same parts, the valve handle mechanism 9 of FIGURE 1 comprises an outer hand wheel disc or member 10, an inner valve stem clutch disc or member 12 and a retainer snap ring 14 adapted to engage in an annular groove 16 in recess 18 of hand wheel 10 (see FIGURE 4). Ring 14 is provided with enlarged perforated ends 20 (see FIGURE 2) provided to receive the prongs of a suitable assembly tool (not shown) customarily provided for assembling such retainer rings.

Disc 12 is formed with a centered square through bore 27 for non-rotatably mounting it on a rotatable member such as square valve stem 26. Any conventional means such as screw 28 and tapped aperture 30 may be used to fixedly attach disc 12 against axial disassembly from stem 26. As shown in FIGURE 5, clutch disc 12 is provided at its periphery with an axially extending clutch notch 32 providing a single radially extending shoulder 34. The upper and lower faces 37 and 39 of disc 12 are each provided with equi-radially spaced conical receiver depressions 38 and 40 (see also FIGURE 6). Depressions 38 and 40 have abnormally large apex angles, preferably of the order of 120°, for a reason to be hereinafter explained.

Hand wheel recess 18 is sufficiently deep to receive disc 12 above groove 16 and defines a depending peripheral skirt 42 surrounding the periphery of disc 12 when assembled therewith. A radially extending stepped through aperture 44 is provided in skirt 42 opposite the periphery of assembled disc 12. As best seen in FIGURE 4, stepped aperture 44 provides an inner portion of minor diameter, an intermediate portion 45 of slightly larger diameter, and an outer portion of still greater diameter, the purpose of which will be presently pointed out. An axially extending stepped through receiver aperture 46 is provided in the end wall of hand wheel 10 in radial alignment with conical depressions 38 and 40 of disc 12 when the hand wheel is fitted over the disc with its enlarged bore 48 uppermost and its minor bore 49 tapped for a purpose to be presently described.

After disc 12 has been non-rotatably fixed to stem 26, hand wheel 10 is telescoped upon about disc 12 and fixed against axial displacement thereon by means of snap ring 14. Normal concomitant rotation of hand wheel 10 and disc 12 is effected through a removable connector means, such as an Allen set screw 54 (FIGURE 7) having a conical end section 56 with an apex angle matingly co-operating with depressions 38 and 40 when aligned therewith and tightened down in the tapped bore 49 of aperture 46 to non-rotatably fixedly connect hand wheel 10 to disc 12. Preferably tapped bore 49 and screw 54 are provided with left hand threads of a special lead so that conventional screws cannot be substituted for set screw 54. The abnormally large apex angles of depressions 38 and 40 obviate the use of a pin or other lock picking instruments in the place of set screw 54 to non-rotatably connect disc 12 and hand wheel 10 since the resulting low angle walls of the depressions act to cam such substituted connectors axially upwardly through aperture 46 allowing hand wheel 10 to rotate about disc 12.

After set screw 54 has been firmly inserted in tapped aperture 46, a nylon plug 58 is preferably press-fit in enlarged diameter upper portion 48 to prevent ready access to set screw 54. Removal of plug 58 may be effected by inserting a pointed instrument into the edge of plug 58 and prying it upwardly.

A clutch pin 60 having an enlarged head 62 freely fitting in intermediate portion 45 of aperture 44 is inserted into the minor diameter portion of aperture 44 and is biased inwardly against the shoulder formed at the inner end of bore 45 by means of a compression spring 64 which is held in place by a permanent press-fit plug 66 seated into the outer portion of aperture 44. Clutch pin 60 thus is biased inwardly of skirt 42 towards the periphery of clutch disc 12 to yieldingly engage the stem end of pin 60 with the periphery of disc 12. As a consequence, pin 60 rides on the periphery of disc 12 reciprocating radially inwardly and outwardly of notch 32 when hand wheel 10 is free to rotate with respect to disc 12 in a counterclockwise direction when assembled as shown in FIGURE 2.

When it is desired to prevent unauthorized unidirectional rotation of the valve and its stem 26, set screw 54 is removed from aperture 46. As illustrated in FIGURE 2, if hand wheel 10 is rotated in valve opening direction (counterclockwise) clutch pin 60 rides the periphery of disc 12 ratcheting into and over the shoulderless side of notch 32 and is ineffective to rotate concomitantly disc 12 and valve stem 26. However, rotation of hand wheel 10 in valve closing direction (clockwise) causes pin 60 to abut shoulder 34 of notch 32 thereby drivingly connecting hand wheel 10 and disc 12 for concomitant rotation in a clockwise direction. Hand wheel 10, accordingly, is only effective for opening the valve when set screw 54 is inserted by authorized personnel since clutch pin 60 and notch 32 act as one-way clutch means enabling valve stem rotation in the closing direction only.

If it is desired to effect the one-way clutch function in the opposite direction, clutch disc 12 is merely inverted on stem 26. In the inverted position shoulder 34 of notch 32 is engaged by pin 60 only upon valve opening rotation (clockwise) of hand wheel 10 and ratcheting of pin 60 over notch 32 occurs when hand wheel 10 is rotated in valve closing direction (counterclockwise).

The invention may be embodied in other specific forms without departing from the spirit or essential characteristics thereof. The present embodiment is therefore, to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tamperproof valve handle for actuating a valve having a stem comprising an actuator member non-rotatably fixed to said stem; a hand wheel member rotatably mounted on and enclosing said actuator means; one-way clutch means interposed between said actuator means and said hand wheel member for normally driving said actuator means in one direction only to position said valve stem and its associated valve to one extreme operative position upon rotation of said hand wheel member in said one driving direction; connector means accessible for installation and removal with respect to said actuator member and said hand wheel member while the hand wheel is mounted on said actuator means; and connector receiver means in at least one of said members permitting installation and removal of said connector means, said connector means when installed providing a positive drive connection between said actuator member and said hand wheel member for drivingly connecting said actuator member and said hand wheel member for unitary rotation in both directions.

2. The tamperproof valve handle of claim 1, wherein said connector means comprises a set screw having a conical end portion of an abnormally wide apex angle of the order of 120 degrees and a left hand thread, and said connector receiver means includes a tapped aperture in one of said members adapted to mate with said left hand thread of said set screw and a conical depression in the other of said members having complemental apex angularity with said set screw conical end portion disposed along the arcute path of travel of said end portion to receive and drivingly cooperate with said set screw when said set screw is threaded home, said abnormal apex angularity and the left hand thread of said set screw being effective to minimize the possibility of unauthorized persons inserting a foreign object to connect said hand wheel member and said actuator member for unitary rotation in both directions.

3. A tamperproof handle for rotating a rotatable member to and positioning it in a preselected position comprising a first annular member removably non-rotatably fixed to said rotatable member; a second annular member having a blind recess therein opening through one face for enclosing said first annular member; a ring groove in said recess inwardly of its open end; a split retainer ring disposed in said groove for rotatably mounting said second annular member on said first annular member; connector means accessible for installation and removal with respect to said first and second annular members while said second annular member is mounted on said first annular member; receiver means on one of said annular members permitting installation and removal of said connector means, said connector means when installed providing a positive drive connection between said first and second annular members to effect unitary rotation thereof in both directions; and one-way clutch means permanently interposed between said first and second annular members to establish a normal uni-directional drive connection between said first and second annular members whereby said rotatable member may be positioned only in a predetermined extreme operative position until said connector means is installed by authorized personnel.

4. The tamperproof handle of claim 3 wherein said first annular member is provided with a peripherally directed clutch notch and its oppositely directed faces are provided with respective shallow conical depressions adapting said first annular member for reversed mounting on said rotatable member to predetermine the directional operation of said one-way clutch means, said connector means comprises a conically tipped set screw having a selective thread, said receiver means comprising a complemental tapped set screw opening radially disposed in said second annular member in a position to effect seating of said conical tip in the opposing shallow conical depression to establish a direct drive connection between said first and second annular members in both directions only when said annular members are properly angularly oriented and said connector means is installed by authorized personnel.

References Cited

UNITED STATES PATENTS

| | | | |
|---|---|---|---|
| 382,637 | 5/1888 | Curtis | 74—45 |
| 976,720 | 11/1910 | Buttorff | 251—230 |
| 1,855,414 | 4/1932 | Otton | 137—385 |
| 2,073,541 | 3/1937 | Trott | 251—230 |
| 2,838,270 | 6/1958 | Danielson | 251—110 |
| 3,174,717 | 3/1965 | Bray | 251—230 |

FOREIGN PATENTS 7,570    6/1886    Great Britain.

HENRY T. KLINKSIEK, *Primary Examiner.*